US009858251B2

(12) United States Patent
Landau (10) Patent No.: US 9,858,251 B2
(45) Date of Patent: Jan. 2, 2018

(54) AUTOMATICALLY GENERATING CUSTOMIZED ANNOTATION DOCUMENT FROM QUERY SEARCH RESULTS AND USER INTERFACE THEREOF

(71) Applicant: Rakuten Kobo Inc., Toronto (CA)

(72) Inventor: Benjamin Landau, Toronto (CA)

(73) Assignee: RAKUTEN KOBO INC., Toronto (CA)

( * ) Notice: Subject to any disclaimer, the term of this patent is extended or adjusted under 35 U.S.C. 154(b) by 277 days.

(21) Appl. No.: 14/459,633

(22) Filed: Aug. 14, 2014

(65) Prior Publication Data

US 2016/0048491 A1 Feb. 18, 2016

(51) Int. Cl.
*G06F 17/00* (2006.01)
*G06F 17/24* (2006.01)
*G06F 17/30* (2006.01)

(52) U.S. Cl.
CPC ...... *G06F 17/241* (2013.01); *G06F 17/30011* (2013.01); *G06F 17/30864* (2013.01)

(58) Field of Classification Search
CPC ............. G06F 17/30864; G06F 17/211; G06F 17/2247; G06F 17/30; G06F 17/3061; G06F 17/30696
See application file for complete search history.

(56) References Cited

U.S. PATENT DOCUMENTS

| 7,664,735 | B2 | 2/2010 | Zhang et al. | |
|---|---|---|---|---|
| 7,921,092 | B2 | 4/2011 | Anick et al. | |
| 8,099,406 | B2 | 1/2012 | Lee | |
| 8,145,617 | B1 | 3/2012 | Verstak et al. | |
| 8,271,502 | B2 | 9/2012 | Svore et al. | |
| 2010/0278453 | A1* | 11/2010 | King | G06Q 10/10 382/321 |
| 2012/0233150 | A1* | 9/2012 | Naim | G06F 17/241 707/722 |
| 2013/0191711 | A1* | 7/2013 | Tashman | G06F 17/241 715/205 |

FOREIGN PATENT DOCUMENTS

WO 2006036376 4/2006

* cited by examiner

*Primary Examiner* — Truong Vo
(74) *Attorney, Agent, or Firm* — Oblon, McClelland, Maier & Neustadt, L.L.P.

(57) ABSTRACT

System and method of automatically generating a user-editable document to save search results for efficient management and utilization by users. A book reading program according to the present disclosure can receive a user search request and automatically save the search results to a designated annotation document according to a predetermined layout. Through various editing functions provided by the book reading GUI, a user can advantageously edit the annotation document. The results may be book or other passages that contain a query term. In the document, the passage themselves can be edited and the user can add additional content by using text editing features.

21 Claims, 5 Drawing Sheets

AUTOMATICALLY GENERATING CUSTOMIZED ANNOTATION DOCUMENT FROM QUERY SEARCH RESULTS AND USER INTERFACE THEREOF

TECHNICAL FIELD

The present disclosure relates generally to the field of electronic books and, more specifically, to the field of user interfaces in electronic books.

BACKGROUND

The use of electronic devices to read books, newspapers and magazines has become increasingly commonplace due to the numerous significant advantages afforded by such devices over conventional paper print. For example, comparing to paper print, an electronic reading device can hold much a greater amount of information, allow immediate access to new books, personalize the reading display format, and facilitate night reading, etc. Electronic reading devices can be implemented as dedicated reading devices, e.g., e-readers, as well as general-purpose electronic devices such as desktops, laptops and hand-held computers.

A user often needs to glean information through searching from documents, rather than reading line by line, for purposes of research, education, recording, inventory, evidence discovery, reference, citation, etc. Conventional book reading software allow a user to submit a search query through a graphical user interface (GUI), e.g., to discover information related to a query term. Then the book is presented in a different format with the pages without the query term removed, allowing the user to navigate through the search results page by page for convenience. A user can also search on the Internet through a web search engine which presents the search results in search result webpages.

However, the search results yielded from either an Internet search query or a book search query are usually presented to a user in a non-editable format. If the user wants to save the search results, he or she typically has to manually open a file (e.g., a Microsoft Word file) and manually copy/paste the search results one by one, or page by page. Then the file can be manipulated in a text processor. When a user needs to search a large amount of information, this process can become time consuming and even cumbersome. Moreover, the conventional text processor is not specially designed for editing search results, may remove formatting and thus lacks convenient functions enabling users to organize and manage search results efficiently.

SUMMARY OF THE INVENTION

Therefore, it would be advantageous to provide a mechanism that allows a user to manipulate search results efficiently.

Embodiments of the present disclosure employ a computer implemented method of automatically saving search results as an editable document and rendering a graphical user interface (GUI) configured to provide a user-friendly editing environment for a user to manage the document. Specifically, a user can submit a search request specifying a query term or terms and a search scope. The search scope can range from a section of a document, an entire document in whole, to a library of documents. The search can be performed through a web search engine implemented on a server device or a search engine implemented on a user device.

The search results are automatically filtered and sorted according to a predetermined template and saved as a separate editable document (the annotation document), e.g., housed in the annotation area of a user device or an e-library account. For instance, each search result is presented in the document as an excerpt encompassing the query term, the source of the excerpt, and a hyperlink directing to the excerpt in the source. The annotation document can be presented and edited through an on-screen graphical user interface (GUI), e.g., a book reading GUI. The GUI has visual objects serving as shortcuts for users to edit the content as well as customize the view of the document, such as remove, sort, filter, format, publish, add content, and so on. Therefore, a user can maintain and utilize search results conveniently and efficiently and can add content to the document via well known word processing functions.

According to one embodiment of the present disclosure, a computer implemented method of generating a customized annotation document comprises: (1) receiving a search query comprising a search term and a search scope originating from a user device; (2) responsive to the search query, searching for the search term according to the search scope; and (3) automatically generating an annotation document to save search results from the searching according to a predetermined template, wherein the annotation document is editable by a user interface with the user device, wherein the search results comprise a plurality of excerpts encompassing the search term and identifications of a plurality of matching documents encompassing the plurality of excerpts.

New search results may be updated to the annotation document. The search results may comprise hyperlinks directing to the plurality of excerpts in the plurality of matching documents. The search scope may specify one or more digital documents located in a storage medium associated with the user device. The search query may specify select fields of the one or more digital documents for searching. The method may further comprise: rendering an on-screen graphical user interface (GUI) for display on a display device coupled to the user device. The GUI may be configured to present the annotation document and receive user instruction to edit and process the annotation document.

In another embodiment of the present disclosure, a computer implemented method of automatically generating customized annotation documents comprises: rendering an on-screen graphical user interface (GUI) for display on a display device, wherein the on-screen GUI is configured to: display content of electronic books; and receive a search query comprising a search term and a search scope from a user. The method further comprises: accessing search results from searching the search term within the search scope; automatically saving the search results to an annotation document, wherein the annotation document is editable according to user input, and wherein further a respective search result comprises a passage encompassing the search term and an identification of a source document encompassing the passage; and displaying the annotation document within the on-screen GUI.

In another embodiment of the present disclosure, a system comprises: a processor; a display device coupled to the processor; and memory coupled to the processor and comprising instructions that, when executed by the processor, cause the processor to perform a method of displaying book content to users. The method comprises: (1) rendering an on-screen graphical user interface (GUI) for display on the display device, wherein the on-screen GUI is configured to: display content of electronic books; and receive a search query comprising a search term and a search scope from a user; (2) automatically saving search results to an annotation document, wherein the search results are yielded from searching the search term within the search scope, wherein the annotation document is editable according to user input, and wherein a respective search result comprises a passage encompassing the search term and an identification of a electronic document encompassing the passage; and (3) displaying the annotation document within the on-screen GUI.

This summary contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

Embodiments of the present invention will be better understood from a reading of the following detailed description, taken in conjunction with the accompanying drawing figures in which like reference characters designate like elements and in which.

DETAILED DESCRIPTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. The drawings showing embodiments of the invention are semi-diagrammatic and not to scale and, particularly, some of the dimensions are for the clarity of presentation and are shown exaggerated in the drawing Figures. Similarly, although the views in the drawings for the ease of description generally show similar orientations, this depiction in the Figures is arbitrary for the most part. Generally, the invention can be operated in any orientation.

Notation and Nomenclature:

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system, or similar electronic computing device, that manipulates and transforms data represented as physical (electronic) quantities within the computer system's registers and memories and other computer readable media into other data similarly represented as physical quantities within the computer system memories or registers or other such information storage, transmission or client devices. When a component appears in several embodiments, the use of the same reference numeral signifies that the component is the same component as illustrated in the original embodiment.

Automatically Generating Customized Annotation Document from Query Search Results and User Interface Thereof Overall, provided herein are systems and methods of automatically generating a user-editable document containing saved search results from a search query for efficient management and utilization by users. Particular, a book reading program according to the present disclosure can receive one or more user search requests and automatically save the search results to a designated annotation document according to a predetermined layout. Through various editing functions provided by the book reading GUI, a user can edit the annotation document to add, delete, rearrange and/or format content therefore.

Although embodiments of the present disclosure are described in detail with reference to the terms of "book" and "book content," the present disclosure is not limited by any specific form, file type, format or language of digital documents for search. The digital documents can be in the form of a book, a magazine, an article, a thesis, a paper, an opinion, a statement or declaration, a piece of news, or a letter, a program source code, etc.

Figure 1:
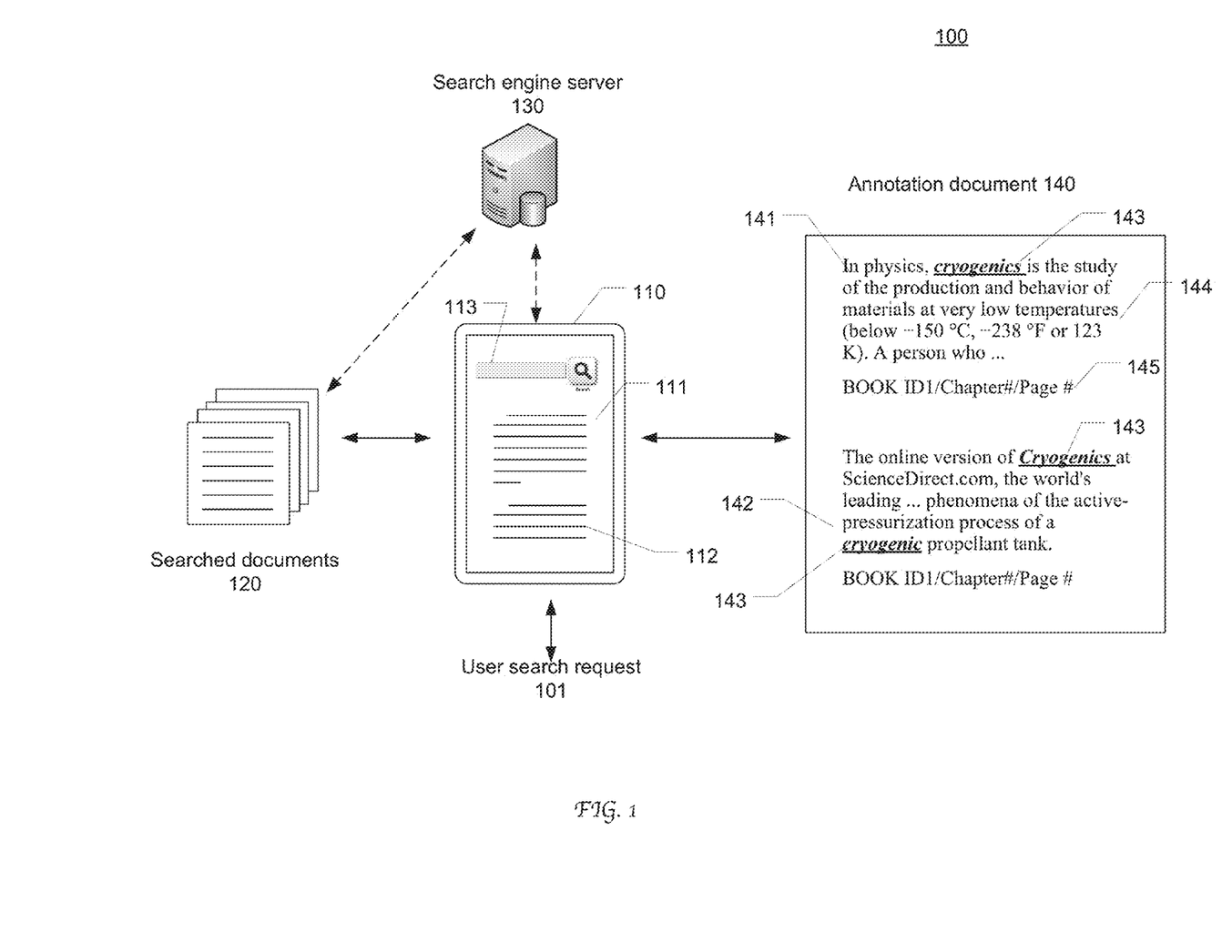
FIG. 1 is a block diagram illustrating an exemplary computer and communication system operable to automatically generate an annotation document to save search results and in accordance with an embodiment of the present disclosure.

FIG. 1 is a block diagram illustrating an exemplary electronic system 100 operable to automatically generate an annotation document 140 to save search results 141 and 142 in accordance with an embodiment of the present disclosure. In this example, a user device 110 is installed with a book reading program which can render a book reading graphical user interface (GUI) 111 on the display device. The book reading GUI 111 has a content display region 112 and a search bar 113 configured to receive a user search request 101.

The user request typically includes a query term and a search scope, e.g., the digital documents subject to search by a search engine. The GUI may allow a user to expressly specify the search scope or use a default search scope until the user affirmatively specifies a different one. A search scope may be the currently displayed page or book, a section of a book, a user collection of books, one or more libraries of books associated with a user account, or any other discoverable document on the Internet. A search is then performed by a search engine based on the search request which includes a query term or query terms. The search engine may be an integral part of the book reading program or an external search engine located in a remote search engine server 130, for example a web search engine. Thus, the search engine searches the query term among the documents 120 based on the search scope. The engine may reside on the client device 110 or on a remote server system 130.

According to the present disclosure, the book reading program can automatically compile the search results, e.g., select passages containing the query term, into a predetermined format and save them to the annotation document 140. The annotation document 140 may be stored in a local storage device in the user device 110 or a remote storage device accessible to the user.

The exemplary annotation document 140 shows two search results 141 and 142. For example, the search result 141 shows the query term 143 in a highlighted format and the selected passage 144 encompassing the query term to provide the context. A search result may also contain an image. The search result also identifies the source 145 of the passage by the book title, the chapter number, and the page number. A hyperlink may be embedded with the source identification 144. A user interaction with the hyperlink can prompt open the book page that encompasses the passage 141. The annotation document 140 can be presented to a user and edited in the book reading GUI 111 based on user input. Therefore, the mechanism of automatically compiling and saving search results to an editable document advantageously eliminates the needs for a user to manually copy and save the search results.

The annotation document 140 may be created in a document format or file format recognizable by a word processor or text process, e.g., a ".doc" format. In such fashion, the annotation document 140 can be opened in the word processor and the well know editing features can be used by a user to add content to the document 140, edit the document, etc.

Figure 2:
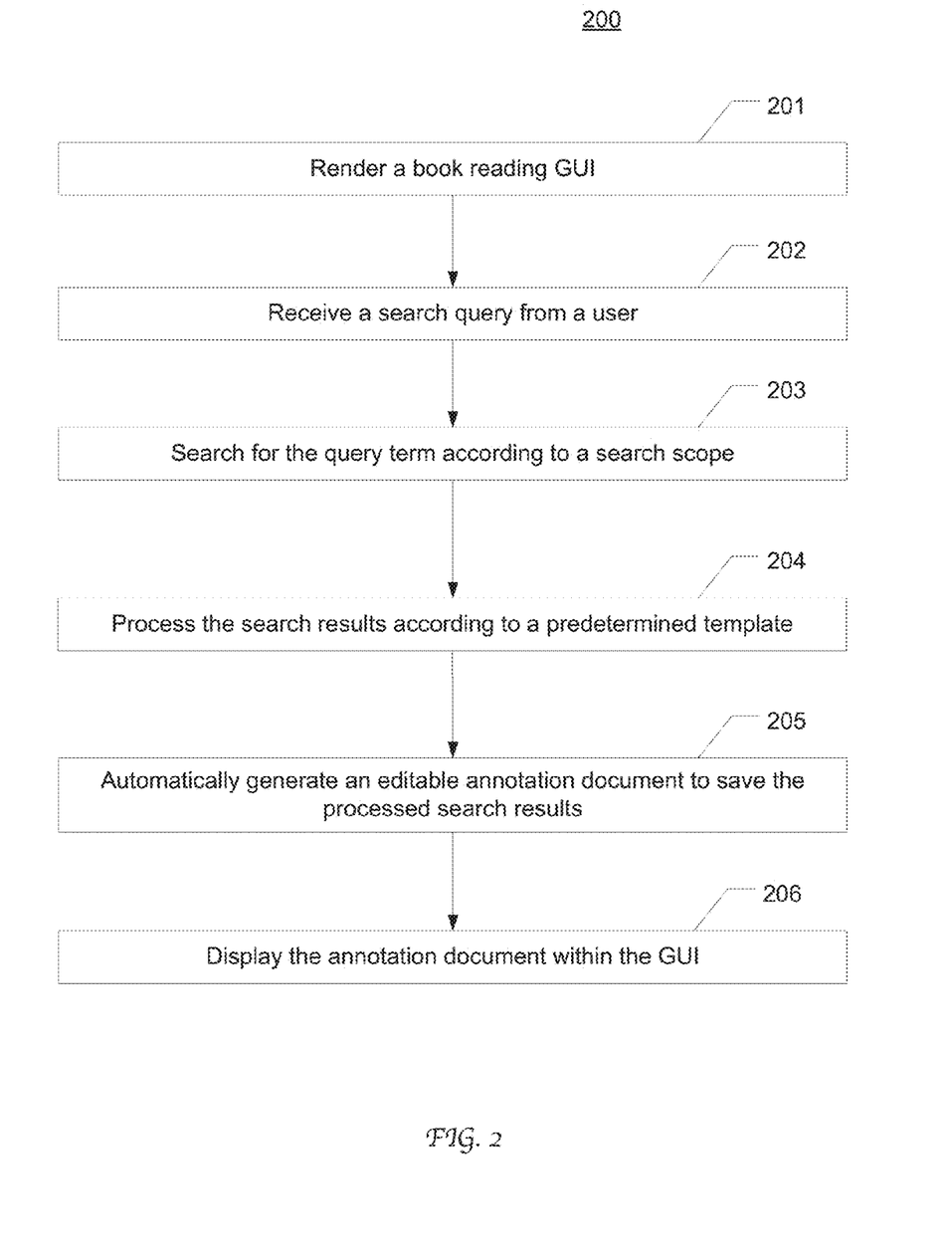
FIG. 2 is a flow chart depicting a computer implemented method of automatically saving search results to a separate editable document according to an embodiment of the present disclosure.

FIG. 2 is a flow chart depicting a computer implemented method 200 of automatically saving search results to a separate document according to an embodiment of the present disclosure. At 201, a book reading GUI is rendered for display. At 202, a search query including a query term or terms is received from a user through the book reading GUI. For purposes of practicing the present disclosure, a query term may include any type of expression recognizable by a computing device, such as a string of characters, a word, a phrase, a symbol, a mathematical formula, an image, and etc. For instance, a search term may corresponds to a new expression that a language student desires to learn, a cooking ingredient that a cook wants to find a recipe for, or a subject matter a researcher needs to find a reference, etc.

At 203, a search is performed to search for the query term according to the search scope. It will be appreciated that the present disclosure is not limited to any specific method, process or algorithm of data mining or information search from digital documents. A search engine according to the present disclosure can be implemented in any method that is well known in the art. In one embodiment, a search result is a passage identified as a predetermined number of words or sentences or paragraphs before and after the terms.

At 204, search results (e.g., passages) yielded from the search are automatically compiled according to a predetermined layout template. For instance, the template defines the lengths of passages to be quoted, the order of presenting the search results, maximum number of search results to be saved for a search event, page locations of each component in a search result, text display formats, and etc. Search results from different search events but for the same query term may be grouped together automatically. Further, if a search result has been entered to the document, it can be detected automatically to prevent a duplicate entry from subsequent search events.

At 205, the processed results are saved to an editable document, e.g., an annotation document having a prescribed file format. A user can create a new file or designate an existing file for saving the search results. Thus, such an annotation document can include search results from different search events and/or search dates. The present disclosure is not limited by the file type of a document for saving search results. In some embodiments, a user may be allowed to select from multiple options with respect to file type.

At 206, the annotation document is presented to the user within the book reading GUI. The book reading program may have various processing functions allowing a user to edit and otherwise manipulate the annotation document. In some embodiments, an annotation document generated and edited according to the present disclosure can be opened and processed in other document processors, such as MS WORD and Notepad, word processors. In this fashion, the user can add notes and other content to the annotation document by using the word processor, etc.

In this embodiment, the process of automatically compiling and saving search results to a separate document is integrated in the book reading software. However, it will be appreciated the embodiments of the process can be implemented as a standalone program that has an interface with one or more search engines, or as an integral part of any other suitable application software.

Figure 3:
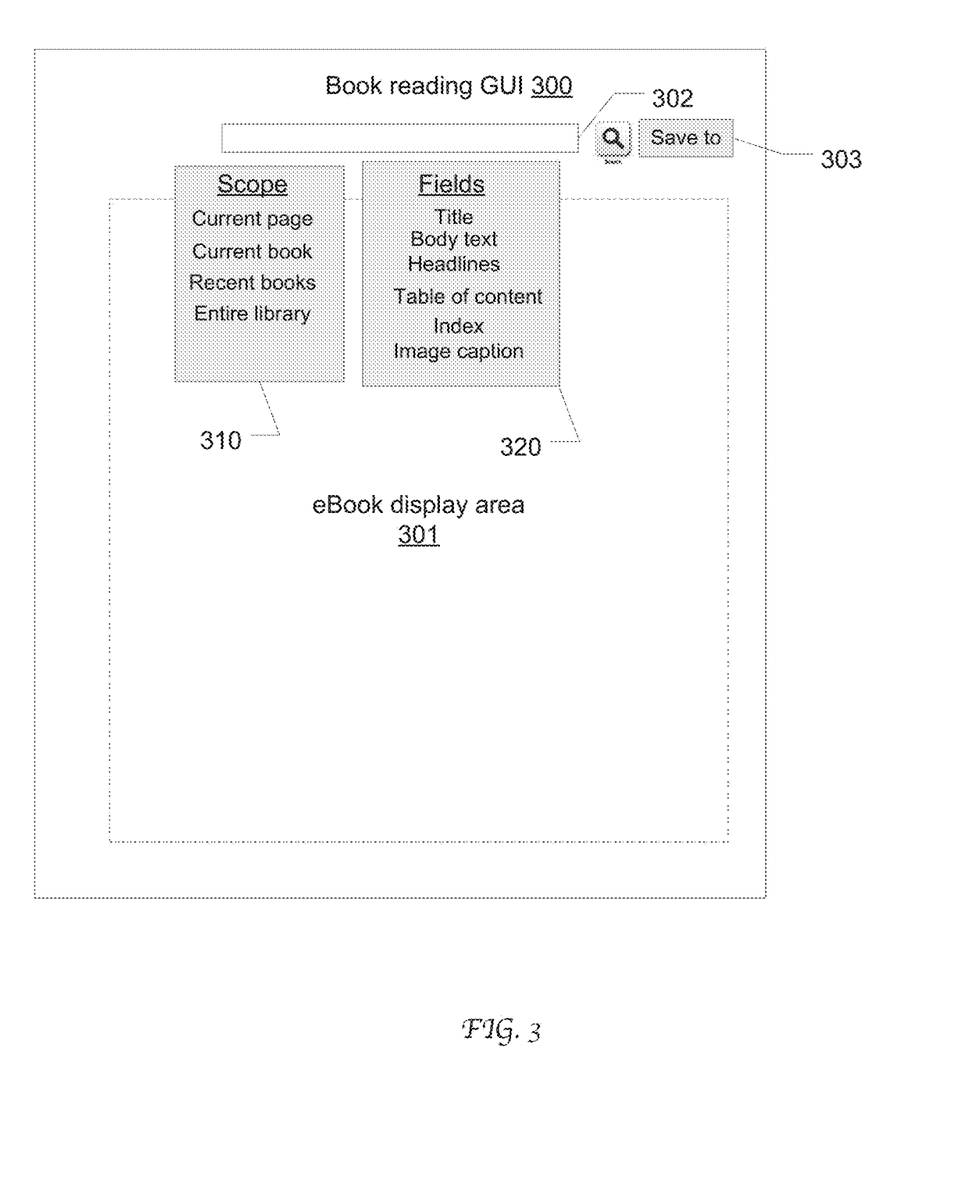
FIG. 3 is a block diagram illustrating an exemplary on-screen layout of a book reading GUI configured to receive a user search request in accordance with an embodiment of the present disclosure.

FIG. 3 is a block diagram illustrating an exemplary layout of a book reading GUI 300 configured to receive a user search request in accordance with an embodiment of the present disclosure. The book reading GUI has an e-book display area 301 for presenting book content. The GUI 300 has a search bar 302 configured to receive user input for a search. Once a user types in a search term, a drop-down options menu "source" 310 is displayed allow the user to specify the source documents to be searched from. A search can be performed on the currently displayed page, a section of or the entire currently displayed book, selected books or genres in the library, the entire library in the user device, a remote e-library under the user's account, multiple e-libraries accessible to the user, new books, or most recently displayed books, and etc. In some embodiments, a user is allowed to specify books to be excluded from a search event.

A drop down menu "Fields" 320 allows the user to specify the fields in each source document for search, such as title, body text, headlines, table of content, index, image caption. For instance, a user may elect to exclude search results collected from headlines and bibliographies. A user can click the "Save to" button 303 to create a new file or designate an existing file and a file type to save the search results. In some embodiments, a new file is automatically created by default for each search event or search date. It will be appreciated that the present disclosure is not limited to any specific function, design, layout, pattern, or configuration of a GUI and components thereof that can be used to receive user search requests.

Upon a search is performed, by an internal or external search engine, the book reading program can access and process the search results based on an annotation document template which itself may be altered by a user. The processed results are then saved to the file. It will be appreciated that the present disclosure is not limited by file type, format, layout, design, template, or configuration of an annotation document.

Figure 4:
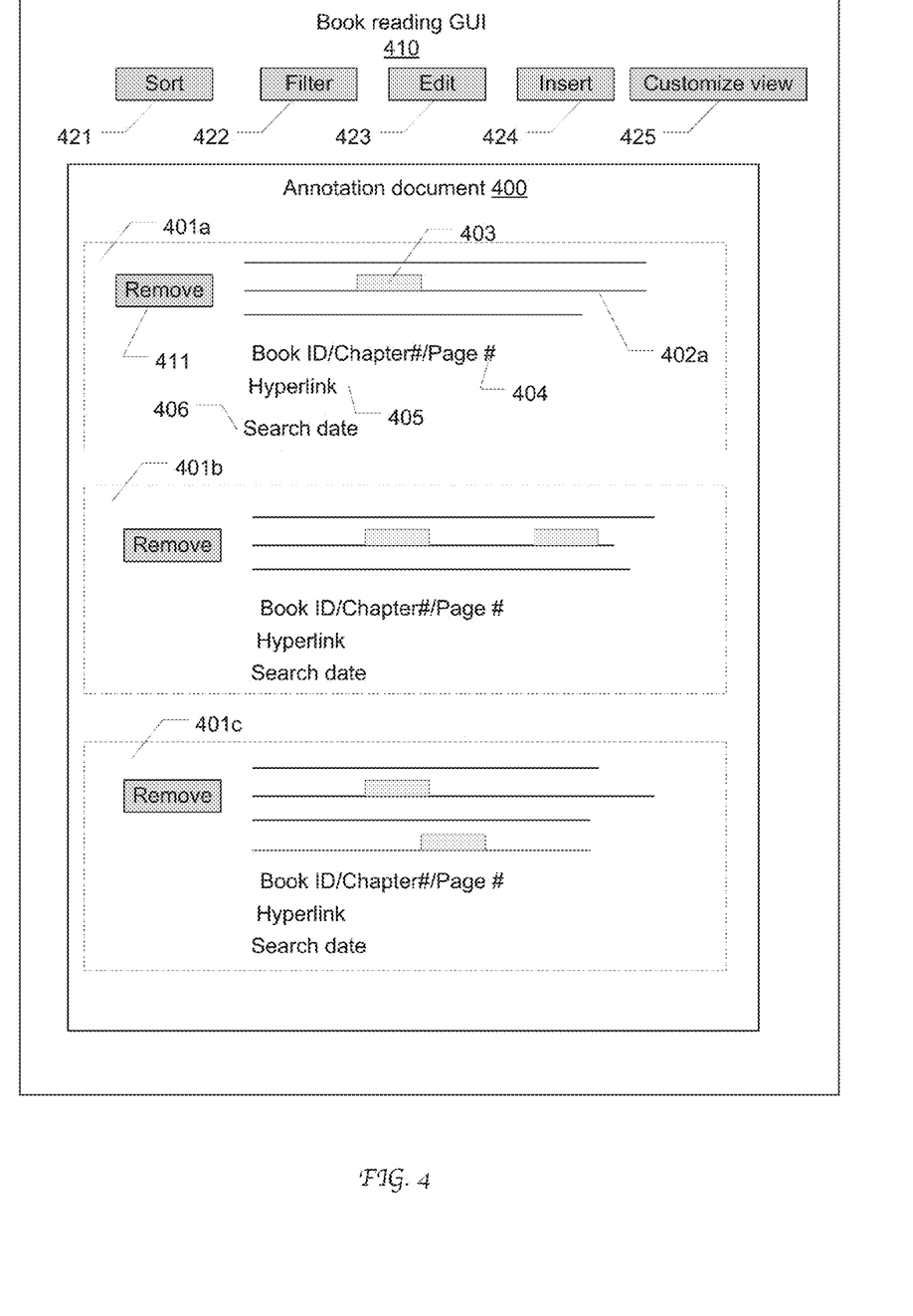
FIG. 4 is a diagram illustrating an exemplary on-screen layout of an annotation document that is automatically generated to save search results in accordance with an embodiment of the present disclosure.

FIG. 4 is a diagram illustrating an exemplary layout of an annotation document 400 that is automatically generated to save search results in accordance with an embodiment of the present disclosure. In this example, the annotation document is presented and editable in the book reading GUI 410. As shown, the annotation document includes 3 search results 401*a*, 401*b*, and 401*c* of a query term 403.

In each search result, the query term 403 is displayed in a conspicuous form and display attribute for emphasis. An excerpt (e.g., 402*a*) containing the query term is displayed to provide the context. The length of each excerpt may be limited to a number of characters or words, a number of sentences before and after the query term, or etc. Also displayed in each search result are an identification (e.g., 404) of the source, a hyperlink (e.g., 405) to the source, and the search result entry date (e.g., 406). When a user clicks a hyperlink, the book page encompassing the search result can be accessed and displayed in the GUI 400, for instance with the query term displayed in a highlighted form. A button "Remove" allows a user to remove the corresponding search result conveniently.

Particular to annotation documents, the book reading GUI 410 contains soft buttons "Sort" 421, "Filter" 422, "Edit" 423, "Insert" 424 and "view" for users to customize the annotation document. When a user interacts with the "Sort" button, an options menu is displayed allowing the user to rearrange the order of the search results, such as by query term, by search date, by source document ID or genre, and so on. A user interaction with the "Filter" button prompts another options menu allowing the user to make some search results hidden or reveal previously hidden results. Through functions associated with the "Filter" button 422, for instance, a user can elect to view only search results from the current day, or all the search results for a specific query term.

The "Edit" button 423 is associated with various editing functions allowing a user to change the display format of the text, such as size, font, color, etc. The "Insert" button 424 is associated with various functions allowing a user to insert other objects in the document, such as a clip, a photo, a video, etc. A user can type in text or a like in the document as well. The "View" button 425 allows a user to change the layout of the document. For example, a user may elect to remove fields of source identifications, hyperlinks and search dates from all the search results and only view the excerpts.

In some embodiments, a user may also be allowed to place certain fields of the search results into footnotes, such as and hyperlinks and search dates. Further, in response to a user request, an index and/or table of contents may be automatically generated for the search results included in the annotation document. A user may be allowed to publish the annotation document to a designated website on the Internet by interacting with the book reading GUI. It will be appreciated that an annotation document including search results according to the present disclosure can be managed and manipulated in various other manners that are well known in the art.

In some embodiments, the book reading program as well as the search annotation generation program according to the present disclosure is implemented on a computing device that is equipped with a touchscreen device, such as a smart phone or touchpad. The GUI is configured such that various user touch gestures can be received and interpreted as user commands to manipulate the annotation document. For example, a user can point-and-drag a search result to move it around, or tap it twice to delete it from the document.

Figure 5:
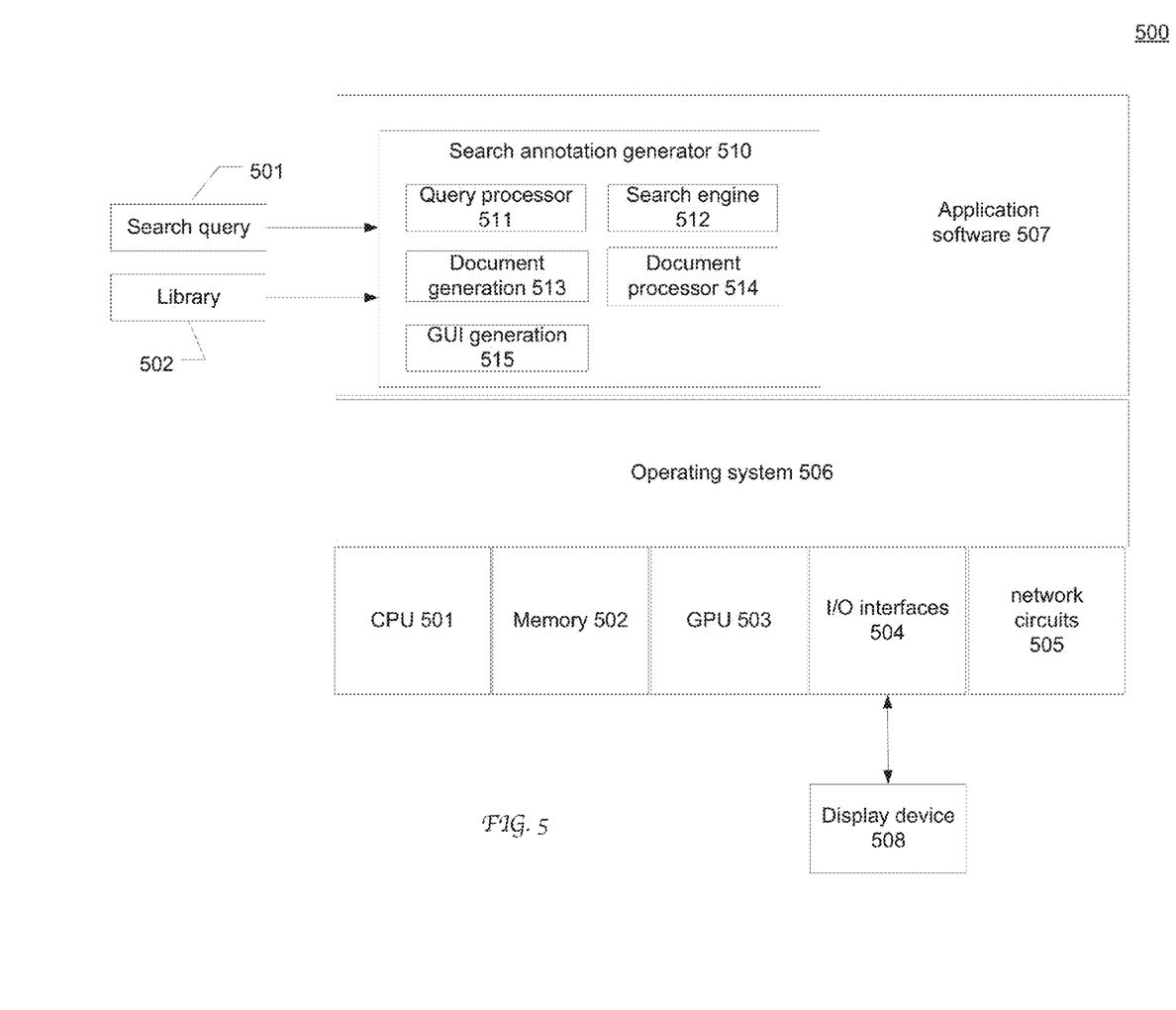
FIG. 5 is a block diagram illustrating an exemplary computing system including an automatic search annotation document generator in accordance with an embodiment of the present disclosure.

FIG. 5 is a block diagram illustrating an exemplary computing system 500 including an automatic search annotation document generator 510 in accordance with an embodiment of the present disclosure. In some embodiments, the computing system 500 is an electronic reading device, such as a desktop, a smart phone, a laptop, a touchpad, or a hand-held computer.

The computing system comprises a processor 501, system memory 502, a GPU 503, I/O interfaces 504 and network circuits 505, an operating system 506 and application software 507 including the search annotation document generator 510 stored in the memory 502. The computing system is also equipment with a display device 508, e.g., a touch screen display device. When incorporating programming configuration and user information collected through the Internet, for example the search request 501 and a library of books 502, and executed by the CPU 501, the automatic annotation document generator 510 can automatically save search results into an editable document in accordance with an embodiment of the present disclosure.

The search annotation document generator 510 may perform various functions and processes as discussed with reference to FIG. 1-4. The automatic annotation document generator 510 encompasses a query processor 511, a search engine 512, a document generation module, a document processor 514, and GUI generation module 515.

The query processor 511 can receive and interpret the search query 501 to generate a search request which is provided to the search engine 512. The search engine 512 can search for the query term across the documents specified in the search scope, e.g., 502. The document generation module 513 can access the search results (passages) and automatically compile them into an annotation document according to a template. The document processor 514 can further process the annotation document according to user input. The GUI generation module 515 can render a GUI to present the document as well as receive user input to manipulate the document.

As will be appreciated by those with ordinary skill in the art, the automatic annotation document generator 510 may include any other suitable components and can be implemented in any one or more suitable programming languages that are known to those skilled in the art, such as C, C++, Java, Python, Perl, C#, SQL, etc.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appHended claims and the rules and principles of applicable law.

What is claimed is:

1. A computer implemented method of generating a customized annotation document comprising:
   receiving a search query comprising a search term and a search scope originating from a user device;
   responsive to said search query, searching for said search term according to said search scope; and
   upon acquisition of search results from said searching, automatically generating an annotation document that is configured to include said search results from said searching according to a template, wherein said annotation document is editable by a user interface with said user device, wherein said annotation document includes a set of search results from different search events and from different search dates, and wherein said search results comprise a plurality of excerpts encompassing said search term and identifications of a plurality of matching documents encompassing said plurality of excerpts.

2. The computer implemented method of claim 1, wherein said generating said annotation document comprises updating said annotation document with new search results, and wherein further said search results further comprise hyperlinks directing to said plurality of excerpts in said plurality of matching documents.

3. The computer implemented method of claim 1, wherein said search scope specifies one or more digital documents located in a storage medium associated with said user device, and wherein further said one or more digital documents are selected from a group consisting of: books, articles, manuals, correspondences, webpages, programming code files, newspapers, dictionary, encyclopedia, and magazines.

4. The computer implemented method of claim 3, wherein said search query specifies select fields of said one or more digital documents for searching, wherein said select fields are selected from a group consisting of document title, image, bibliography, text body, index, table of content, and headline.

5. The computer implemented method of claim 1 further comprising:
rendering an on-screen graphical user interface (GUI) for display on a display device coupled to said user device, wherein said GUI is configured to:
present said annotation document; and
receive user instruction to edit and process said annotation document.

6. The computer implemented method of claim 5, wherein the set of search results includes search results for a single query that was performed a plurality of times, and wherein said GUI is configured to automatically group the search results for the single query from the different search events and the different search dates.

7. A computer implemented method of automatically generating customized annotation documents, said method comprising:
rendering an on-screen graphical user interface (GUI) for display on a display device, wherein said on-screen GUI is configured to:
display content of electronic books; and
receive a search query comprising a search term and a search scope from a user;
responsive to said search query, searching for said search term according to said search scope;
upon acquisition of search results from said searching, automatically saving said search results to an annotation document,
wherein said annotation document is configured to include said search results,
wherein said annotation document is editable according to user input,
wherein said annotation document includes a set of search results from different search events and from different search dates, and wherein further a respective search result comprises a passage encompassing said search term and an identification of a source document encompassing said passage; and
displaying said annotation document within said on-screen GUI.

8. The computer implemented method of claim 7, wherein said search scope identifies a section of an electronic book, and further comprising searching said section for said search term to yield said search results.

9. The computer implemented method of claim 7, wherein said search scope identifies a collection of electronic books accessible to said user, and wherein further said collection of electronic books reside in remote storage devices coupled to said display device via a communication network.

10. The computer implemented method of claim 9, wherein said search query further comprises search criteria related to classifications, search fields and reading histories of said collection of electronic books.

11. The computer implemented method of claim 7, wherein said respective search result further comprises a hyperlink directing to said source document, wherein said on-screen GUI is further configured to display a page of said source document responsive to a user interaction with said hyperlink, and wherein said page encompasses said passage.

12. The computer implemented method of claim 7, wherein said on-screen GUI comprises a graphic object associated with said respective search result, and further comprising:
receiving a user interaction with said graphic object; and
responsive to said user interaction, removing said search result from said annotation document.

13. The computer implemented method of claim 7, wherein said on-screen GUI comprises an option menu configured to receive a user instruction to sort said search results by a plurality of sorting criteria, and wherein said plurality of criteria comprise source document title, source document genre, search term, and date of search.

14. The computer implemented method of claim 7, wherein said displaying said annotation document comprises displaying said search term in a different format from other terms in said passage.

15. The computer implemented method of claim 7, wherein said displaying said annotation document comprises, in response to a user instruction, displaying hyperlinks of said search results as footnotes and displaying passages of said search results as a body text.

16. A system comprising:
a processor;
a display device coupled to said processor; and
memory coupled to said processor and comprising instructions that, when executed by said processor, cause the processor to perform a method of displaying book content to users, said method comprising:
rendering an on-screen graphical user interface (GUI) for display on said display device, wherein said on-screen GUI is configured to:
display content of electronic books; and
receive a search query comprising a search term and a search scope from a user;
responsive to said search query, searching for said search term according to said search scope;
upon acquisition of search results from said searching, automatically saving said search results to an annotation document,
wherein said search results are yielded from searching said search term within said search scope, wherein said annotation document is configured to include said search results, wherein said annotation document is editable according to user input, wherein said annotation document includes a set of search results from different search events and from different search dates, and wherein a respective search result comprises a passage encompassing said search term and an identification of an electronic document encompassing said passage; and displaying said annotation document within said on-screen GUI.

17. The system of claim 16, wherein said search scope identifies a collection of electronic documents accessible to said user, and wherein further said collection of electronic documents reside in a local storage device coupled to said processor.

18. The system of claim 16, wherein said search query further comprises search criteria specified by said user.

19. The system of claim 16, wherein said search result further comprises a hyperlink directing to said source document, wherein said on-screen GUI is further configured to display a page of said electronic document responsive to a user interaction with said hyperlink, and wherein said page encompasses said passage.

20. The system of claim 16, wherein said display device is a touch screen display device, and wherein said on-screen GUI is further configured to receive a user instruction via said touch screen display device to remove a search result from said annotation document, wherein said user instruction corresponds to a double-tap gesture.

21. The system of claim 16, wherein said on-screen GUI comprises an option menu configured to receive a user instruction to sort said search results by a plurality of sorting criteria, and wherein said plurality of sorting criteria are related to source document title, source document genre, search term, and date of search.

* * * * *

UNITED STATES PATENT AND TRADEMARK OFFICE
CERTIFICATE OF CORRECTION

PATENT NO.        : 9,858,251 B2
APPLICATION NO.   : 14/459633
DATED             : January 2, 2018
INVENTOR(S)       : Benjamin Landau Page 1 of 1

It is certified that error appears in the above-identified patent and that said Letters Patent is hereby corrected as shown below:

In the Specification

Column 3, Line 6, change "encompassing the search term and an identification of a" to --encompassing the search term and an identification of an--.

Column 8, Line 54, change "only to the extent required by the appHended claims" to --only to the extent required by the appended claims--.

Signed and Sealed this
Twenty-fifth Day of June, 2019

Andrei Iancu
*Director of the United States Patent and Trademark Office*